United States Patent Office 3,367,479
Patented Feb. 6, 1968

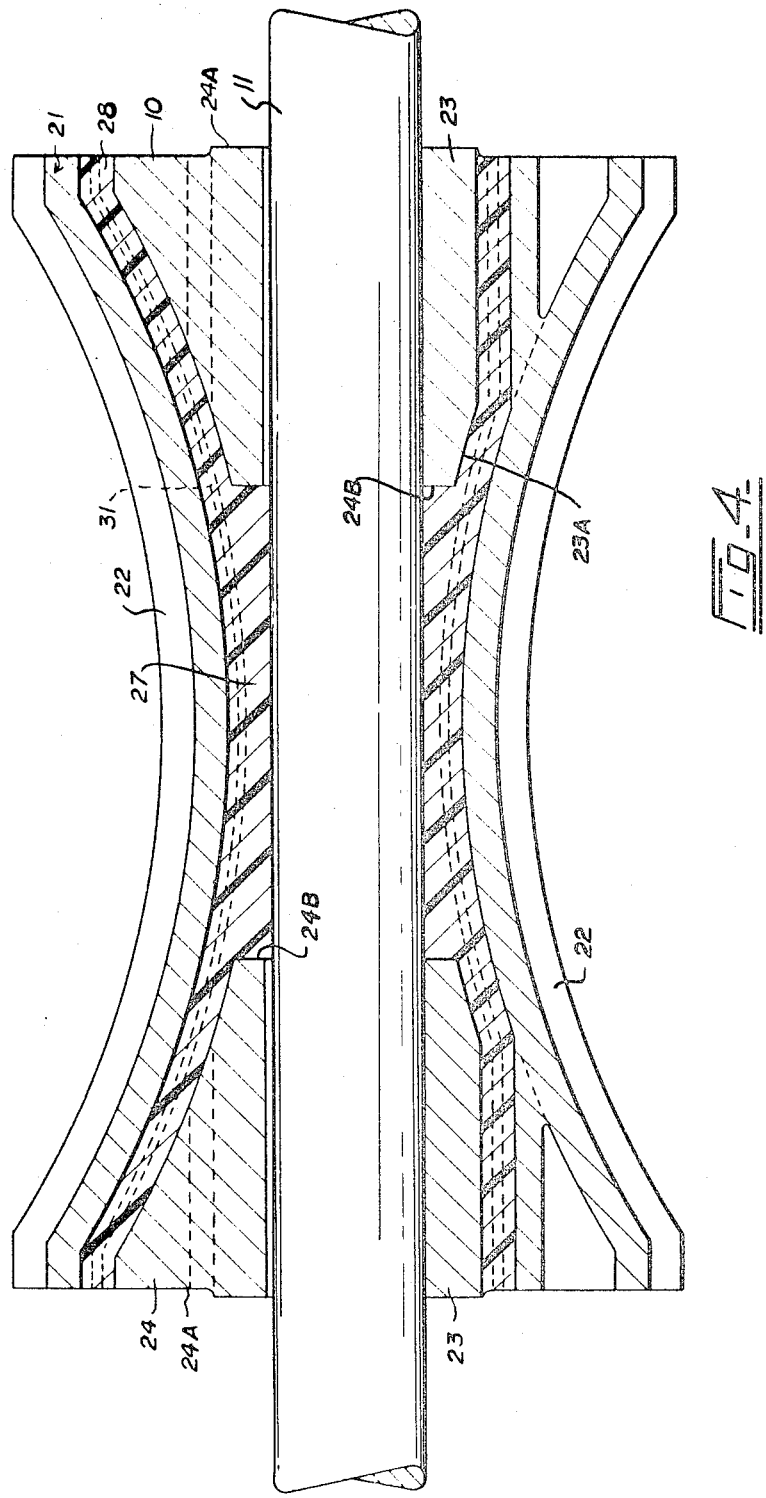

---

3,367,479
IMPACT ABSORBING APPARATUS
Gordon M. Letson, No. 5 Road, Whonnock, British Columbia, Canada, and Robert A. Baldrey, 1087 17th St., West Vancouver, British Columbia, Canada
Filed June 13, 1966, Ser. No. 557,141
11 Claims. (Cl. 198—127)

ABSTRACT OF THE DISCLOSURE

A shock absorbing roll for heavy duty roll cases in the timber industry, an elastomer impact absorbing element in a serrated space between the roll and its shaft, so as to be resilient radially and having tangential rigidity adequate for transmission of torque by compressive forces in the elastomer acting on the serrations.

---

Figure 1:
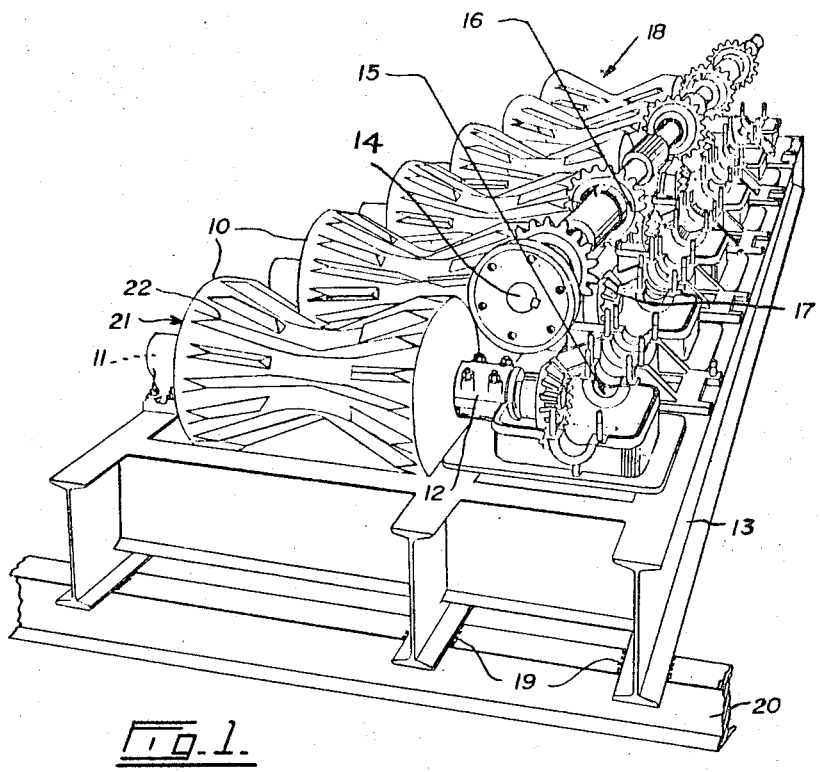

The invention relates to an impact absorbing structure in a rotating member subject to repeated impact, and in particular to a shock absorbing roll for use in heavy duty roll cases such as are common in the timber industry.

A heavy duty roll case has a plurality of spaced rolls having parallel shafts journalled in bearings secured to a massive frame. The rolls are of hour glass shape, usually fluted on an external surface, and are driven by a drive shaft having gear means adapted to rotate the shafts of the rolls. It is usual that a number of such units, perhaps upon one frame and driven by a common drive shaft, are used in tandem. Alignment, and more particularly maintenance of that alignment after the equipment is set up, are important in a single such unit, and even more so when several units are used in tandem as above.

Logs perhaps weighing fifty tons are commonly dealt with, thus there is a large impact as each log drops on the rolls, which impact is transmitted by the roll to the shaft, thence to the bearings. Consequently, even when heavy bearings are used impact failure is common. Further, the impact is transmitted by the bearings to the frame, then to structural steel members of a floor to which the frame is secured. 15 inch, and even 20 inch, structural steel members are used in roll case frames to mitigate effects of impact, and to reduce misalignment problems.

To reduce the impact transmitted through this substantial frame to the floor girders, pads have been used between the frame and the floor steel. While this is effective in reducing the impact on the floor steel, early bearing failure and other impact troubles still occur. For example, non-rigid attachment of the frame to the floor steel tends to increase the difficulty in maintaining alignment. It will be understood by those skilled in the art that large repeated impact transmitted from member to member of a metal structure has undesirable results, such as for example fatigue, to reduce the effects of which may be difficult and expensive.

It is well known to provide an annular insert for impact absorption, for instance between a wheel and a shaft. In heavy duty applications of which the roll case above is an example, difficulties arise in providing an annular resilient member with adequate bearing axes and ability sufficiently to absorb heavy impact while, at the same time, providing adequate shear strength and torsional rigidity to transmit the required torque—since in such a construction the torque is transmitted through the resilient annulus by bond and shear.

We have found that the difficulties and disadvantages above are materially reduced by the use of structure according to the present invention. In a heavy duty roll case the first member to be subject to impact is the roll, hence means are provided to absorb the impact between the roll and its shaft, thus materially to reduce the impact transmitted beyond the shaft. That is to say, the subject invention provides resilience in a direction radial to the shaft, and sufficient rigidity normal to the radius to transmit the necessary driving torque. Because of the radial resiliency the impactive load in the roll shaft bearings is greatly reduced. It is found that in a roll case including shock absorbing rolls according to our invention, pads between the frame and the floor members are no longer necessary, hence the frame may be welded directly to the floor steel to provide rigid connection thereto. Problems of misalignment resulting from non-rigid pad connections between the frame and the floor steel are thus avoided.

The present invention provides, a shaft including a comparatively small number, later particularized, of circumferentially spaced outwardly extending ribs which suitably, are formed on a hub of the shaft, and a hollow outer member fins of which are of complementary shape, and extend into spaces between the said ribs, defining a serrated space between faces of the ribs and fins. A resilient element, desirably an elastomer having physical properties as below specified in detail, fills the said serrated space. In this way, torque is not transmitted between the outer element and the shaft mainly by bond between the resilient member surfaces of the serrated space, but mainly by forces normal to faces of the complementary ridges and fins from compressive stress of the elastomer, and at the same time the required radial resiliency is obtained.

In a specific embodiment of the invention in a roll of heavy duty roll case, particular configurations of the outwardly extending members are used in combination with an elastomer having physical properties within a specified range. Such an embodiment, and constructions alternative thereto, are described in detail below with reference to the drawings. It is to be understood that embodiment is not restricted to a roll of a roll case, which is given by way of example.

Figures 2, 3:
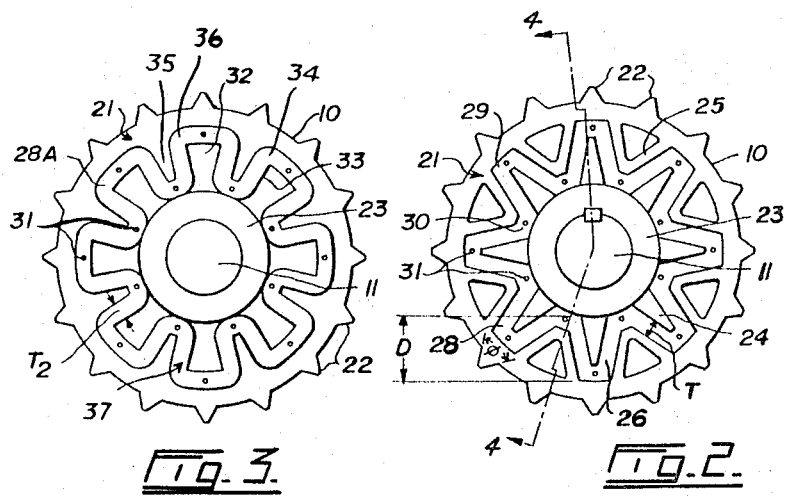

In the drawings,

FIGURE 1 is a perspective of a heavy duty roll case including a plurality of rolls having impact absorbing structure according to the present invention, FIGURE 2 is an end elevation of a subject roll shown secured to its shaft, FIGURE 3 is an end elevation showing an alternative shape for the elastomer insert, FIGURE 4 is an enlarged section on line 4—4 of FIGURE 2.

FIGURE 1 shows a plurality of rolls 10 of the subject invention, each having a shaft 11 journalled in bearings 12. The shafts 11 are transverse of a massive frame 13 and spaced for independent rotation of the rolls by means of a longitudinal drive shaft 14 journalled in bearings 15. In the figure, the drive shaft is shown removed from its bearings. Rotation of the drive shaft 14 by external means (not shown) causes the individual rolls to rotate by obvious cooperating gear means 16, 17, which may include split mitre gears according to Canadian Patent 612,214. The foregoing equipment indicated generally by the numeral 18 is known in the art as a heavy duty roll case. Girders of the frame 13 are preferably welded, as indicated at 19, to floor girder members— one of which is shown, indicated by the numeral 20. Floor decking is not shown. Rigidity and alignment are important hence, as is well known, the frame members and floor members are required to be massive, and strongly secured to one another as by welding.

A preferred embodiment of our invention is in an impact absorbing roll adapted to comprise a roll element in a heavy duty roll case such as is above descirbed, which equipment and the use thereof is well known.

A subject roll 10 is now described in detail with reference to FIGURES 2 and 4.

A hollow outer member indicated generally by the numeral 21, is hour-glass shaped having an outer surface usually fluted as indicated at 22, the shape and fluting being according to the prior art.

The shaft 11 has spaced hubs 23 shrunk and/or keyed thereto, alternatively the hubs may be integral of the shaft. Each hub has a number of circumferentially spaced outwardly extending longitudinal ridges 24. The ridges are generally triangular in cross-section and, as seen in FIGURE 4, reduce in radial depth inwards from an outer end wall 24-A to an inner end wall 24-B so as also to be generally triangular in longitudinal section as seen in FIGURE 4.

An inner surface of the hollow outer member 21 is, as best seen in FIGURE 2, of complementary shape having an equal number of complementary, inwardly extending, spaced elements 25, herein referred to as fins. The outer member 21 being coaxial with the shaft and hubs, adjacent surfaces of the hub ridges 24 and the complementary fins 25 are parallel and spaced apart by a distance designated, in FIGURE 2 only, T. A space 26 of thickness T between the hub and the outer shell is thus defined by the adjacent surfaces aforesaid, which space is hereinafter referred to as being "serrated" in section.

Referring to FIGURE 4, the inner surface of the outer hollow member is spaced from the shaft throughout its length, defining generally annular space 27 between the shaft outer surface and the hollow member inner surface between facing inner end walls 24-B of the hubs 23. The thickness of the annulus at the middle of the roll, is not less than T aforesaid. Inner ends of the hubs 23 are tapered as shown at 23-A.

The serrated spaces 26 at the ends of the roll and the intervening annular space 27 are filled with an elastomer, designated generally by the numeral 28.

We find a self-curing polyurethane elastomer having properties within the ranges given in Table I below to be satisfactory.

*Table I*

Acceptable properties of a polyurethane elastomer for use in an impact absorbing roll of the subject invention.

| | |
|---|---|
| Shore A durometer hardness | 30–60 |
| ASTM ultimate tensils strength, p.s.i. | 65–255 |
| ASTM percentage elongation | 130–150 |
| 100% Modulus, ASTM, p.s.i., full cure at 75° F. | 55–240 |
| ASTM tear strength, pounds/inch | 20–50 |
| Compression set, full cure 75° F., ASTM (Method A) percent | 15–57 |
| Tensile strength after 24 hours at 75° F., p.s.i. | 40–48 |
| Lineal shrinkage modulus at 75° F. | 0.0001 |

A such material is readily obtainable from ordinary trade sources, the liquid polyurethane "Flexane" manufactured by Devcon Canada Limited of Scarborough, Ontario is suitable. Flexane types 30 and 60 correspond respectively to the lower and upper limits of Table I.

Methods of pouring the urethane to fill the said space are well known, and therefore are not described.

The elastomer so poured is homogeneous. We find it to be desirable to provide a local increase of resiliency of the elastomer in the vicinity of the apices 28, FIGURE 2, at the areas indicated in FIGURE 2 by the numerals 29 and 30. This can be done by providing an elastomer of different properties in these areas but, while this is physically acceptable, constructional difficulties arise. We avoid these difficulties by providing longitudinal hoses, 31, at the said apices and central of the thickness of the elastomer. Desirably the hose extends the full axial length of the serrated spaces 26, and may extend through the full length of the roll. The hose is of material which will not collapse during the pouring of the elastomer, and which will not interact undesirably therewith. The inside diameter of the hose should be from about $T/2$ to about $T/6$.

Referring now to FIGURE 2, it is seen that the serrated section 26 filled with elastomer provides much greater superficial areas than would be the case were an annular section used. Thus the serrated construction with adequate thickness T takes advantage of well known elastomer properties in providing an impact absorbing medium.

It is further apparent that, in structure according to the present invention, torque is transmitted mainly by normal components of forces acting upon faces of the ridges and fins, rather than mainly by bond between the elastomer and the surfaces, and consequent shear stress, as would be the case were a geometrically annular space, containing an elastomer, provided between the hubs and the outer element.

The angle at the apex of the generally triangular fins 26, FIGURE 2, is shown as some 25° and the number of ridges is eight. Neither is critical, $\phi$ may be from 15° to 45° with increase or decrease in the number of ridges. The thickness T is a matter of design and, in rolls of a size common in heavy duty roll cases, one inch is satisfactory. D, FIGURE 2, indicates the radial depth of the serrated space 26, that is to say the radial depth of the elastomer 28. At one limit D may extend to the surface of the shaft 11, when there would be no hub—the ridges 24 would then be integral with the shaft. The value of D in relation to $\phi$ and T is a matter of design. In a particular practical case where $T$=one inch and $\phi$=25°, the design value of D is four inches.

In the example shown in FIGURE 2, the number of ridges, that is to say the number of serrations of the elastomer, is 8. It is evident that these several factors bear simple mathematical relation to one another. It is also clear that, other things being equal, when the number of serrations becomes very large, the space 26 will begin to function in the same manner as an annulus of thickness T, that is torsion will be transmitted mainly by bond and shear stress of the elastomer. Thus the number of serrations must be kept relatively small. While the required relatively small number is not critical, we have found that optimum results are obtained when that number is between 4 and 16.

We claim:

1. Impact absorbing structure comprising in combination, a rotatably mounted shaft, a hollow coaxial outer element spaced from the shaft, and a resilient member occupying the space between the outer element and the shaft, said shaft including circumferentially spaced ridges defining a hub on each end of said shaft, said hollow element having inwardly extending circumferentially spaced fins, the said fins extending into spaces between said hub ridges, a space serrated in section is defined by adjacent spaced surfaces of the ridges and fins, said resilient member fixed in said serrated space, and the foregoing structure being adapted to be resilient radially to the shaft for absorption of impact, and for tangential rigidity for the transmission of torque.

2. Structure as defined in claim 1, wherein the fins and ridges are generally triangular in section having substantially parallel adjacent spaced surfaces.

3. Structure as defined in claim 2 the angle at the apex of the generally triangular section being between the approximate limits of 15° and 45°.

4. Structure as defined in claim 3, wherein the resilient member is a polyurethane elastomer having properties within upper and lower ranges as below indicated,

| Property: | Range |
|---|---|
| Shore A durometer hardness | 30–60 |
| ASM ultimate tensile strength, p.s.i. | 65–255 |
| ASM percentage elongation | 130–150 |
| 100% Modulus, ASM, pounds/square inch full cure at 75° F. | 55–240 |
| ASM tear strength, pounds/inch | 20–50 |
| Compression set, full cure 75° F., percent | 15–57 |
| Tensile strength after 24 hours at 75° F., pounds/sq. in. | 40–48 |

5. Structure as defined in claim 2 wherein the resilient member is weakened by having, substantially central of an apex of the serrated space, a longitudinally extending hose having an internal diameter of from one-half to one-sixth of the distance between said parallel adjacent spaced surfaces.

6. Structure as defined in claim 1, and means to weaken the resilient member at an apex thereof.

7. Structure as defined in claim 6, wherein the weakening is effected by a longitudinally extending hose substantially central of the apex of the serrated space, the said hose having an internal diameter of from one-half to one-sixth of the distance between the said parallel adjacent spaced surfaces.

8. Structure as defined in claim 1, wherein; the number of spaced ridges is between 4 and 16; wherein the said ridges are defined by generally radial sidewalls, and by end walls arcuate in section, the spacing between the ridges being uniform and substantially equal to the width of the ridges; and wherein the fins are of complementary shape being defined by walls generally parallel to and uniformly spaced from the ridge walls aforesaid.

9. Structure as defined in claim 3, wherein the resilient member is a polyurethane elastomer having properties within upper and lower ranges as below indicated,

| Property: | Range |
|---|---|
| Shore A durometer hardness | 30–60 |
| ASM ultimate tensile strength, p.s.i. | 65–255 |
| ASM percentage elongation | 130–150 |
| 100% Modulus, ASM, pounds/square inch full cure at 75° F. | 55–240 |
| ASM tear strength, pounds/inch | 20–50 |
| Compression set, full cure 75° F., percent | 15–57 |
| Tensile strength after 24 hours at 75° F., pounds/sq. in. | 40–48 |

10. Structure as defined in claim 9, wherein the resilient element has a weakened portion substantially central of a space defined in part by an arcuate end wall of a longitudinal ridge.

11. Structure as defined in claim 10, wherein the said portion is weakened by having a longitudinally extending hose substantially central of a space defined in part by an arcuate end wall of a longitudinal ridge, the internal diameter of the hose being from one-half to one-sixth of the distance between the generally parallel spaced walls aforesaid.

References Cited

UNITED STATES PATENTS

| 475,628 | 5/1892 | Stombs | 198—127 |
|---|---|---|---|
| 1,894,432 | 12/1933 | Watson | 198—192 |
| 2,668,054 | 2/1954 | Lorig | 198—202 X |
| 3,184,828 | 5/1965 | Dames | 29—132 X |
| 3,211,278 | 10/1965 | Arndt | 198—192 |

FOREIGN PATENTS

| 676,474 | 12/1963 | Canada. |
|---|---|---|
| 941,415 | 11/1963 | Great Britain. |

RICHARD E. AEGERTER, *Primary Examiner.*